United States Patent
Kottilingam et al.

(10) Patent No.: US 7,146,725 B2
(45) Date of Patent: Dec. 12, 2006

(54) REPAIR OF COMBUSTION TURBINE COMPONENTS

(75) Inventors: Srikanth C. Kottilingam, Orlando, FL (US); Peter J. Ditzel, Orlando, FL (US)

(73) Assignee: Siemens Power Generation, Inc., Orlando, FL (US)

(*) Notice: Subject to any disclaimer, the term of this patent is extended or adjusted under 35 U.S.C. 154(b) by 414 days.

(21) Appl. No.: 10/669,867

(22) Filed: Sep. 24, 2003

(65) Prior Publication Data

US 2005/0015980 A1    Jan. 27, 2005

Related U.S. Application Data

(60) Provisional application No. 60/468,396, filed on May 6, 2003.

(51) Int. Cl.
*B23P 6/00*    (2006.01)
(52) U.S. Cl. .............. 29/889.1; 29/402.11; 29/402.13; 29/402.16
(58) Field of Classification Search ............. 29/889.1, 29/402.11, 402.13, 402.16, 402.07
See application file for complete search history.

(56) References Cited

U.S. PATENT DOCUMENTS

| | | | |
|---|---|---|---|
| 4,611,744 A * | 9/1986 | Fraser et al. ................ 228/119 |
| 4,878,953 A * | 11/1989 | Saltzman et al. ........... 148/512 |
| 5,395,584 A | 3/1995 | Berger | |
| 5,556,560 A | 9/1996 | Ahola | |
| 5,913,555 A | 6/1999 | Richter | |
| 6,129,795 A | 10/2000 | Lehockey | |
| 6,197,178 B1 | 3/2001 | Patel | |
| 6,264,817 B1 | 7/2001 | Timoshenko | |
| 6,376,801 B1 | 4/2002 | Farrell | |
| 6,884,964 B1 * | 4/2005 | Murphy ................ 219/137 R |

OTHER PUBLICATIONS

Sermatech International Incorporated, Turbine Life Cycle Support Services/Steam Turbines, Sermatech Website : Steam Turbine Repair (www.lehrprecision.com/repair_steam), 1 page.

* cited by examiner

*Primary Examiner*—Marc Jimenez

(57) ABSTRACT

A method of repairing a combustion turbine component having damage located at or near a cooling hole or hollow or geometrically complex portion of the component is provided. The method comprises forming a preparatory groove that extends from a surface of the component to the damaged area but does not extend to the cooling hole or hollow or geometrically complex portion of the component, the groove extending 40–90% the distance from the component to the damaged area; spraying a filler material into the groove with a micro-plasma torch at a current of less than 50 amperes; and filling the groove with the filler material such that the heated filler material substantially extends from the cooling hole or hollow or geometrically complex portion of the component to a surface of the component.

20 Claims, 1 Drawing Sheet

REPAIR OF COMBUSTION TURBINE COMPONENTS

CROSS REFERENCE TO RELATED APPLICATIONS

This application claims the benefit of U.S. Provisional application No. 60/468,396, filed May 6, 2003.

FIELD OF THE INVENTION

This invention relates generally to the field of combustion turbine component repair and in particular, to a repair technique adapted to weld cracks or other defects located near hollow or geometrically complex portions of the combustion turbine component.

BACKGROUND OF THE INVENTION

Gas turbine engines are known to include a compressor section for supplying a flow of compressed combustion air, a combustor section for burning fuel in the compressed combustion air, and a turbine section for extracting thermal energy from the combustion air and converting that energy into mechanical energy in the form of a rotating shaft. Many components that form the combustor and turbine sections are directly exposed to hot combustion gasses, for example, the combustor basket and liner and nozzles, the transition duct between the combustor and turbine sections, and the turbine stationary vanes and rotating blades and surrounding ring segments.

It is also known that increasing the firing temperature and the combustion gas can increase the power and efficiency of the combustion turbine. Modern high efficiency combustion turbines have firing temperatures that exceed temperatures of about 1,600° C., and even higher firing temperatures are expected as the demand for even more efficient engines continues. Thus, the cobalt and nickel based superalloy materials traditionally used to fabricate the combustion turbine components used in the hot gas path section of the combustion turbine engine must be aggressively cooled and/or insulated from the hot gas flow in order to survive long term operation in this aggressive high temperature combustion environment.

Notwithstanding these protective efforts, the combustion turbine components nonetheless tend to suffer operational damage such as thermal fatigue, oxidation, corrosion, creep and the like, which typically causes cracking and spallation of the superalloy and/or protective ceramic coating. To further complicate matters, these cracks and spallation are caused by a variety of factors and formed in a variety of locations. For example, channel cracks can form on an interior cooling channel of the component and propagate to the component surface due to component weakness near the hollow channels.

Since these high temperature resistant components are quite expensive, it is often desirable to repair rather than replace damaged components. Several repair methods are conventionally used to repair such cracked or spalled combustion turbine components. For example, gas tungsten arc welding, laser welding, diffusion brazing and wide gap brazing are used for crack repair. If a welding technique is used, each particular welding technique has its own advantages and disadvantages.

Accordingly, there is a need for an improved method of repairing cracked or spalled combustion turbine components. There is also a need for an improved welding technique for the repair of cracked combustion turbine components.

SUMMARY OF THE INVENTION

A method of repairing a combustion turbine component exposed to a high temperature operational environmental using a welding technique adapted to repair cracks, burning, oxidations, spalls and the like near hollow or geometrically or metallurgically complex portions of the combustion turbine component is provided.

One aspect of the present invention involves a method of repairing a combustion turbine component having damage located at or near a cooling hole or hollow or geometrically complex portion of the component, comprising: forming a preparatory groove that extends from a surface of the component to the damaged area but not extend to the cooling hole or hollow or geometrically complex portion of the component, the groove extending 40–90% the distance from the component to the damaged area; spraying a filler material into the groove with a micro-plasma torch at a current of less than 50 amperes; and filling the groove with the filler material such that the heated filler material substantially extends from the cooling hole or hollow or geometrically complex portion of the component to a surface of the component.

Another aspect of the present invention involves a method of repairing a cracked combustion turbine component, comprising: providing a micro-plasma torch adapted to provide a low heat input to the component using a current of less than 50 amperes, the torch operatively associated with a filler material source; making a preparatory groove along at least a portion of the crack; and passing the torch along the groove, the crack located at or near a cooling hole or hollow or geometrically complex portion of the component, such that the filler material is heated by the torch and then deposited within the crack.

Another aspect of the present invention involves a repaired combustion turbine component, comprising: a superalloy material formed into the general shape of the component; and a welded filler material continuously extending from near a cooling hole or hollow or geometrically complex portion of the component to a surface of the component, the filler material deposited by a micro-plasma torch.

BRIEF DESCRIPTION OF THE DRAWINGS

These and other advantages of the invention will be more apparent from the following description in view of the drawings that include.

DETAILED DESCRIPTION OF THE INVENTION

The invention described herein employs several basic concepts. For example, one concept relates to a method of repairing a cracked combustion turbine engine component where the crack is located near a hollow or geometrically complex portion of the component. Another concept relates to combustion turbine engine component repaired by a micro-plasma welding technique.

The present invention is disclosed in context of use as a transition duct 10 within a combustion turbine engine. The principles of the present invention, however, are not limited to transition ducts 10. For example, the principles of the present invention can be used to fabricate other combustion turbine components, such as combustion liners, combustion baskets, combustion nozzles, blades, vanes, and ring segments. For another example, the principles of the present invention can be used with aerospace applications, such as airplanes with combustion turbine engines. For another example, the principles of the present invention can be used to repair components made of materials other than superalloys and ceramics having cracks located near a hollow or geometrically complex portion of the component. One skilled in the art may find additional applications for the apparatus, processes, systems, components, configurations, methods, and applications disclosed herein. Thus, the illustration and description of the present invention in context of an exemplary transition duct 10 within a combustion turbine engine is merely one possible application of the present invention.

Figure 1:
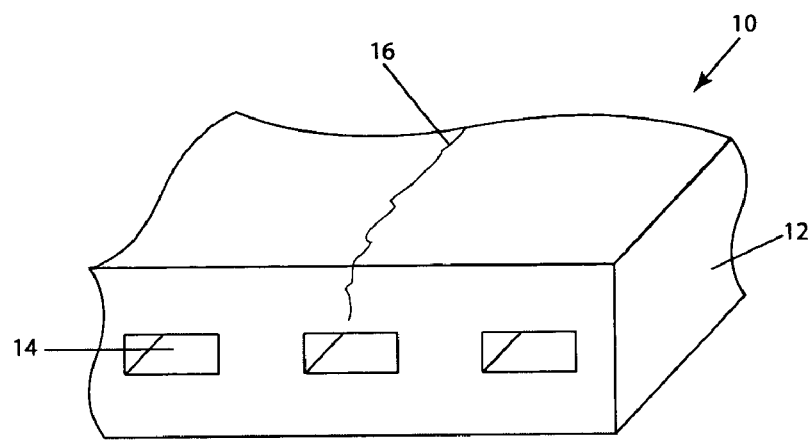
FIG. 1 is a perspective view of an exemplary portion of a combustion turbine component having a crack near a cooling hole.

Referring now to FIG. 1, a portion of an exemplary transition duct 10 is illustrated. The transition duct 10 is advantageously formed from a plurality of cooling panels 12 each of which are typically made from solid solution strengthened or precipitation strengthened wrought sheet superalloy materials such as nickel and cobalt-based alloys containing chrome, aluminum, titanium and other constituents, and attached together by nickel brazing or diffusion bonding. A ceramic thermal barrier coating, bond coating, or environmental coating (none shown) may be applied to a surface of the superalloy. A plurality of cooling channels or holes 14 are advantageously formed on at least one cooling panel 12 to cool the transition duct 10 via convection, effusion, impingement and the like cooling. Although the cooling holes 14 are illustrated with a rectangular geometry, to other geometries could be used such as square, oval, circular and the like. A service crack 16 is shown extending longitudinally along a cooling channel 14 and vertically from near the cooling channel 14 to the exterior surface of the transition duct 10. This type of crack is commonly known as a channel crack. This exemplary illustrated crack has a width of about 0.05 mm, a length of about 6 mm, and a depth of about 1.5 mm. As previously noted, many other types of service cracks may form on the transition duct or other combustion turbine component such as a zipper crack, longitudinal panel crack, partial wall crack, through-wall crack, vane leading edge crack, blade trailing edge crack, exit hole radial crack, and the like as will be understood by those skilled in the art. Also, non-service cracks may form on the transition duct or other combustion turbine component such as those due to errors while manufacturing the transition duct or other combustion turbine component. Further, cracks, weaknesses, or spallation may also develop at or near geometrically complex portions of the transition duct or other turbine component such as cooling hole exit erosion, corner radii erosion and the like.

This invention is particularly suited for cracks having a width of about 0.01–4 mm, a length of greater than about 1 mm, a depth of about 0.5–10 mm, and located adjacent or near a hole or geometrically complex portion of the combustion turbine component, although it also could be used outside these parameters. This invention is also particularly suited for areas of spallation or weakness having a diameter/perimeter of about 1–10 mm, and located adjacent or near a hole or geometrically complex portion of the combustion turbine component. As used herein, the term "geometrically complex" means having a closed form with a surface geometry that intersects with at least one other different surface geometry. Typically, at least one of the surface geometries is substantially or generally circular, oval, rectangular, or square, although there is no requirement of any particular geometry.

Figure 2:
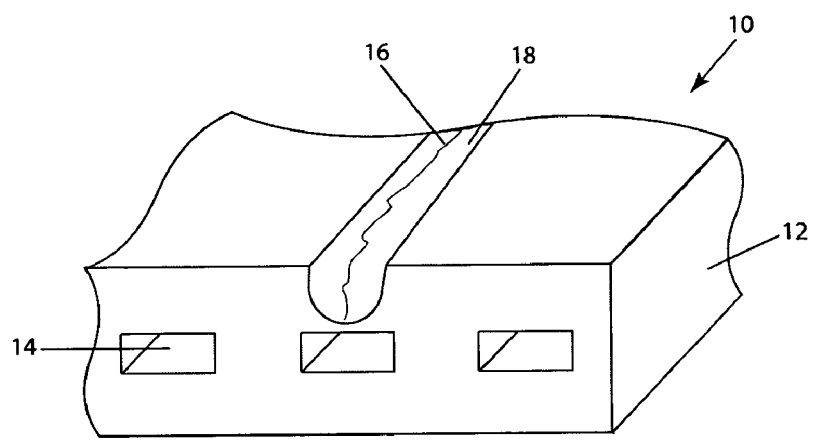
FIG. 2 is a perspective view of the combustion turbine component of FIG. 1, showing a preparatory groove formed along the crack above the channel.

Referring to FIG. 2, a preparatory groove 18 is shown extending longitudinally co-axially with the crack 16, vertically co-axially with the crack 16 but not through the entire depth of the crack 16 and terminating near but not at the cooling hole 14, and having a width that extends greater than the width of the crack 16 on both sides of the crack 16. The groove 18 can be formed by any suitable method, such as hand grinding, conventional machining or electrical discharge machining. If the groove 18 is prepared by a hand grinding method method, it can be formed by utilizing a standard narrow thickness cut off grinding wheel with a suitable width fitted into a high speed die grinder and traversing the grinder along the length of the crack 16.

Care should be taken to form the groove 18 with dimensions that assist the repair processes of the present invention. Suitable dimensions advantageously include a longitudinal length slightly greater (e.g. about 0.5–4 mm) than the longitudinal length of the crack 16 so that any weak areas toward the longitudinal end(s) of the crack 16 are also repaired. The groove 18 advantageously has a vertical depth of about 40%–90% of the crack 16 depth, preferably about 60%–70%. Thus, the preparatory groove 18 does not remove or carve out the entire crack 16, but rather leaves a portion of the crack 16 vertically extending from the cooling hole 14 toward the groove 18. The vertical depth of the groove 18 is advantageously generally conical shaped promote better fusion, although other geometries could be used such as U-shaped, oval, circular, and the like.

The groove 18 advantageously has a lateral width about 1.1–5 times, preferably about 1.5–2.5 times, the width of the crack 16 so that any weak areas toward the lateral end(s) of the crack 16 are also repaired. If the preparatory groove 18 is formed to repair an area of spallation or weakness, rather than a crack 16 suitable dimensions advantageously include a perimeter that extends about 1–5 mm beyond the spalled or weakened area, except that the preparatory groove should leave a portion of the area extending from the hollow or geometrically complex portions to remain intact.

Figure 3:
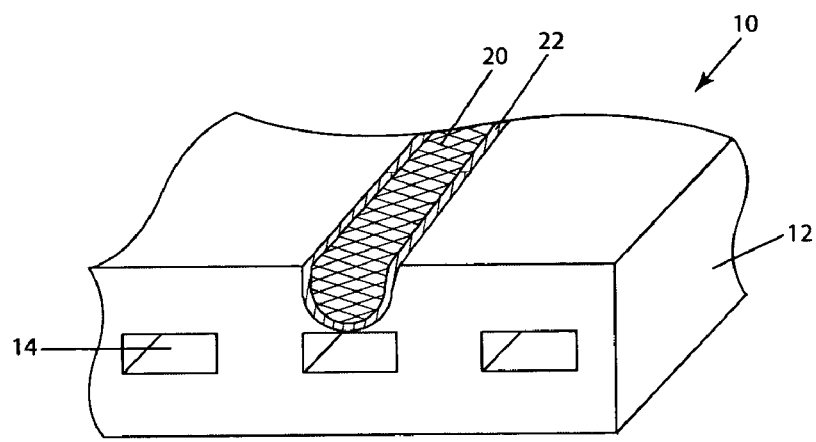
FIG. 3 is perspective view of the combustion turbine component of FIG. 2, showing a micro-plasma weld filled area near the cooling hole and a heat-affected area extending from the preparatory groove caused by micro-plasma welding.

Referring to FIG. 3, after the preparatory groove 18 is formed, a micro-plasma weld and welding system is used to fill the groove 18 with a suitable filler material 20 and thereby repair the crack 16. The welding system advantageously comprises a filler material 16, a power supply, and a plasma torch.

The filler material 20 may comprise any material suitable to fill the preparatory groove 18 and operate in the high temperature combustion turbine environment, such as metals, superalloys, ceramics, combinations thereof and the like. The filler material 20 is advantageously provided in powder form for ease of application. Suitable superalloys powders include alloys 617, 625, 263 and the like. Suitable ceramic powders include yttria-stabilized zirconia in a ratio of about 8–12 mole percent of $Y_2O_3$ with the remaining balance zirconia, without regard to operational dopants or additives, and preferably about 7–10 mole percent. If more than one filler material 20 is used, the particles can be mixed or agglomerated by spray drying or other suitable process to provide a generally freely flowing plasma spray feed powder. The feed powder preferably has a particle size and configuration to assist a uniform flow, provide consistent flow to the plasma powder feed torch, and provide a more homogenous applied filler material 20. Dopants or additives can be incorporated into or with the filler powder 20. Alternatively, a wire feeder may be used to provide the filler material 20 in a form other than powder. Suitable wire feeders include drive rollers and a motor controller. Such feeders are commercially available from companies such as Jetline Engineering, Liburdi Dimetrices, and CK Worldwide.

If a filler powder 20 is used, the filler powder 20 is micro-plasma deposited into the preparatory groove 18 of the transition duct 10 to form a generally uniform layer characterized by accumulated molten particle beads.

It has been found that a suitable micro-plasma deposition can be generated by a powder supply providing an arc discharge having a voltage of about 10–50 volts, preferably about 20–30 volts, a current of less than about 50 ampers, preferably about 10–40 amperes, and a heat input of about 1–10 kJ/cm, preferably about 2–5 kJ/cm. The powder feed rate is advantageously about 2–10 grams/minute, preferably about 3–5 grams/minute. A plasma torch suitable to achieve these parameters is commercially available from the Process Welding Systems, Inc. company as Model No. MP5-13. The torch advantageously has a nozzle orifice diameter of about 0.5–5 mm, preferably about 1–2 mm which spreads the powder at an angle of about 5–15 degrees. Suitable plasma and shielding gases include argon, helium, hydrogen, combinations thereof the like.

During 304 the applications process, the standoff distance between the torch nozzle and the transition duct 10 is about less than 10 mm, preferably about 2–5 mm. The plasma should be directed substantially perpendicular to the transition duct 10, since low angle deposition tends to exaggerate the bead formation. It has also been found advantageous to direct traverse of the spray torch along the longitudinal length of the crack 16 at a generally constant velocity of about 30–200 mm/min, preferably about 50–150 mm/min, and to make a plurality of passes or revolutions (e.g. 2–40) along or around the transition duct 10 (or vice versa) to fill the preparatory groove 18 with filler powder 20 or wire feeder filler.

Still referring to FIG. 3, the filler material 20 is shown completely filling the preparatory groove 18 with excess filler material ground off or smoothed such that the filler material 20 is substantially planar with the exterior surface of the transition duct 10. However, the filler material 20 need not completely fill the preparatory groove 18, excess filler material 20 need not be ground or smoothed, and the filler material 20 need not be substantially planar with the transition duct 10.

The low amperage micro-plasma welding process offers low heat input, which provides for a small heat affected zone 22 (See FIG. 3) on or within the transition duct 10. Since there is a small heat affected zone, weld repair operations can be performed at or near cooling holes, or hollow or geometrically complex portions of the transition duct 10 without affecting, modifying or altering the surrounding geometry of the cooling hole or portion. Thus, the cooling function of the cooling holes is not degraded by the weld repair operation. The low heat input also reduces, if not eliminates, degraded weldability due to service induced material changes at or substantially near regions.

Aspects in addition to the low heat input that the micro-plasma welding process of the present invention advantageously includes the ability to form a stable constricted or concentrated arc even a very low amperages, a relative insensitivity to arc length changes, and a reduction in distortion or permanent alternation of the original geometry. Thus, deformation of the cooling passages, or hollow or geometrically or metallurgically complex portion of the transition duct 2, as well as macroscopic deformation of the overall structure 2 can be reduced, and further, repair of external cracks locally without removing the ceramic thermal barrier coating can be performed. Additionally, the micro-plasma process of the present invention advantageously provides for reduced porosity relative to other welding processes such as laser welding. That is, porosity forms from the laser welding process as a result of the turbulent nature of the keyhole which invites gas absorption, and due to the rapid cooling which traps the porosity. In contrast, the keyhole or wet puddle uses with micro-plasma welding is more stable and thus does not promote gas absorption, and the micro-plasma cooling rate is sufficiently slow to allow entrapped gas to evolve or escape from the welding before final solidification.

Moreover, since the micro-plasma weld repair process requires relatively little manual dexterity, manual on-site or in-facility operation is easy. However, automated spray processes could also be used such as those described in U.S. Pat. No. 6,376,801.

Some additional or supplemental examples of weld repair using the present micro-plasma process are provided. For example, a crack located at the leading edge of a turbine vane can be repaired by removing the crack to a depth of about 70–90 percent of the vane wall thickness, depositing a filler material generally matching the base metal into the repair groove, blending flush the finished weld deposit, and then heat treating the post weld filler material and vane. For another example, a radial crack located off an exit hole could be prepared with a countersink or counterboring tool if the diameter of the cracking is encompassed by a practical diameter-to-depth ratio. And a copper or other type of rod can be used as a backing to maintain the diameter of the hole, which is then reamed to the desired dimensions. For another example, a crack located at the trailing edge of a turbine blade could be repaired by removing the entire thickness of the trailing edge of the blade to leave a through thickness U-shaped groove. The repair material could then be deposited in the groove cavity with copper or other suitable material as a backing, after the micro-plasma weld repair, the deposit is then blended flush with the airfoil, and then holes can be re-drilled through the repair deposit.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim:

1. A method of repairing a combustion turbine component having damage located at or near a cooling hole or hollow or geometrically complex portion of the component, comprising:

forming a preparatory groove that extends from a surface of the component to the damaged area but does not extend to the cooling hole or hollow or geometrically complex portion of the component, the groove extending 40–90% the distance from the surface of the component to a portion of the damaged area that is closest to the cooling hole or geometrically complex portion of the component;

spraying a filler material into the groove with a micro-plasma torch at a current of less than 50 ampers; and filling the groove with the filler material such that the heated filler material substantially extends from the cooling hole or hollow or geometrically complex portion of the component to a surface of the component.

2. The method of claim 1, wherein the damage is located at a cooling hole.

3. The method of claim 1, wherein the damage is located near an area of spallation.

4. The method of claim 1, wherein the damage is located near a geometrically complex area of the component.

5. The method of claim 1, wherein the damage is a crack.

6. The method of claim 1, wherein the damage is a chip.

7. The method of claim 1, wherein the damage is caused by oxidation or corrosion.

8. The method of claim 1, wherein the component is a transition duct.

9. The method of claim 1, wherein the preparatory groove extends 60–70% the distance from the component to the damaged area.

10. The method of claim 1, wherein the preparatory groove is formed by hand grinding or machining.

11. The method of claim 1, wherein the filler material is provided in a powder form or a wire feeder form.

12. The method of claim 1, wherein the filler material comprises a ytrria stabilized zirconia composition.

13. The method of claim 1, wherein the micro-plasma torch has a nozzle orifice of about 1–2 mm which spreads the powder at an angle of about 10 degrees.

14. The method of claim 1, wherein the micro-plasma torch has a heat input of about 2–5 kJ/cm.

15. The method of claim 1, wherein the groove is completely filled with the filler material.

16. The method of claim 1, further comprising smoothing the filler material so that it is substantially planar with the component surface.

17. The method of claim 1, wherein the crack has a width of about 0.01–4 mm, a length of greater than 1 mm, and a depth of 0.5–10 mm.

18. The method of claim 17, wherein the width of the preparatory groove is substantially constant along the entire length of the groove.

19. A method of repairing a combustion turbine component having damage located at or near a cooling hole, comprising:

forming a preparatory groove that extends from a surface of the component to the damaged area but does not extend to the cooling hole, the groove extending 40–90% the distance from a surface of the component to a portion of the damaged area that is closest to the cooling hole;

placing a filler material into the groove with a spray torch at a current of less than 50 amperes; and filling the groove with the filler material such that the heated filler material substantially extends from the cooling hole to a surface of the component.

20. The method of claim 19, wherein a width of the preparatory groove is substantially constant along a length of the groove.

* * * * *